United States Patent
Zhang et al.

(10) Patent No.: US 12,311,729 B2
(45) Date of Patent: May 27, 2025

(54) APPARATUS FOR ASSEMBLING A HEAT PUMP

(71) Applicant: ZHEJIANG ZOCH TECHNOLOGY Co. Ltd., Hangzhou (CN)

(72) Inventors: Shicheng Zhang, Hangzhou (CN); Yunpeng Hou, Hangzhou (CN); Yuzhi Guo, Hangzhou (CN); Tong Wu, Hangzhou (CN); Pengfei Zhang, Hangzhou (CN); Chunyu Dai, Hangzhou (CN); Kaiqiang Yan, Hangzhou (CN); Binqi Rao, Hangzhou (CN); Yan Zhang, Hangzhou (CN); Keyun Wang, Hangzhou (CN); Ke Shi, Hangzhou (CN)

(73) Assignee: ZHEJIANG ZOCH TECHNOLOGY Co. Ltd., Hangzhou (CN)

( * ) Notice: Subject to any disclaimer, the term of this patent is extended or adjusted under 35 U.S.C. 154(b) by 0 days.

(21) Appl. No.: 18/626,003

(22) Filed: Apr. 3, 2024

(65) Prior Publication Data
US 2024/0246389 A1 Jul. 25, 2024

Related U.S. Application Data

(63) Continuation-in-part of application No. 18/111,142, filed on Feb. 17, 2023, now abandoned.

(30) Foreign Application Priority Data

Jul. 4, 2022 (CN) .......................... 202210788281.6

(51) Int. Cl.
*B23P 19/04* (2006.01)
*B60H 1/00* (2006.01)

(52) U.S. Cl.
CPC .......... *B60H 1/00485* (2013.01); *B23P 19/04* (2013.01); *B60H 1/00828* (2013.01); *B60H 2001/00928* (2013.01)

(58) Field of Classification Search
CPC ....................................................... B21P 19/04
See application file for complete search history.

(56) References Cited

U.S. PATENT DOCUMENTS 3,088,198 A * 5/1963 Svenson ............... F04D 29/628
                                                                29/888.024
4,158,383 A * 6/1979 Rayfield ................. F24F 11/76
                                                                    361/166

(Continued)

*Primary Examiner* — Sarang Afzali
(74) *Attorney, Agent, or Firm* — Kunzler Bean & Adamson; Scott D. Thorpe

(57) ABSTRACT

For assembling a heat pump, an apparatus includes a loading part located in an initial section of the fully automatic intelligent production line of an integrated thermal management module. The apparatus includes a first assembling part, located downstream of the loading part, that assembles a refrigerant side components of the heat pump. The apparatus includes a first testing part, located downstream of the first assembly part, that tests the refrigerant side components. The apparatus includes a second assembling part, located downstream of the loading part, that assembles the cooling water side components of the heat pump. The apparatus includes a second testing part, located downstream of the second assembling part, that tests the cooling water side components. The apparatus includes a finished product part, located downstream of the second testing part, that outputs a finished product.

15 Claims, 18 Drawing Sheets

(56) References Cited

U.S. PATENT DOCUMENTS

| | | | | |
|---|---|---|---|---|
| 6,477,849 | B2* | 11/2002 | Butts | G01M 99/008 |
| | | | | 62/160 |
| 8,418,530 | B1* | 4/2013 | Scaringe | G01M 3/228 |
| | | | | 73/23.31 |
| 9,568,128 | B2* | 2/2017 | Okada | F16L 23/003 |
| 9,933,190 | B2* | 4/2018 | Sedlak | F24H 4/04 |
| 10,883,893 | B2* | 1/2021 | Shaw, Jr. | G01M 3/2876 |
| 2010/0064778 | A1* | 3/2010 | Simpson | F16K 37/0091 |
| | | | | 73/46 |
| 2021/0207830 | A1* | 7/2021 | Chen | F24F 11/36 |
| 2022/0196513 | A1* | 6/2022 | Li | G01M 3/2876 |

* cited by examiner

APPARATUS FOR ASSEMBLING A HEAT PUMP

CROSS-REFERENCE TO RELATED APPLICATIONS

This is a continuation-in-part application of and claims priority to U.S. patent application Ser. No. 18/111,142 entitled "THERMAL MANAGEMENT INTEGRATED MODULE" filed on Feb. 17, 2023 for Shicheng Zhang, which is abandoned and is incorporated herein by reference, which claims priority to Chinese Patent Application No. CN 202210788281.6, DAS access code 02E7, filed on Jul. 4, 2022, for Shicheng Zhang, the entire contents of which are incorporated herein by reference for all purposes.

BACKGROUND INFORMATION

With the promotion of new energy vehicles, consumers' expectations for new energy vehicles have further increased. For consumers, the driving experience of the car is particularly important. In new energy vehicles, the heat pump is used to adjust the temperature of the cab, providing a comfortable driving environment for the driver and improving the driver's driving experience. Heat pumps have played an important role in improving the driving experience, so today's new energy vehicle market also puts forward higher requirements for the quality of heat pumps.

However, in current techniques, there is no standardized production process for the heat pump, so it is difficult to improve the production efficiency of the heat pump and control the production quality of the heat pump. Therefore, it is necessary to propose a technical solution to solve the problems that the heat pump has low production efficiency and is difficult to control the production quality.

BRIEF DESCRIPTION

The present application provides a fully automatic intelligent production line for a thermal management integrated module, which is used for assembling a heat pump, including: a loading part, which is located in the initial section of the fully automatic intelligent production line of the thermal management integrated module; a first assembling part, which is located downstream of the loading part, used to assemble the refrigerant side part of the heat pump; the first test part, located downstream of the first assembling part, is used to test the refrigerant side part, the first test part includes a test module; the second assembling part, located in the loading part The downstream part is used to assemble the cooling water side components of the heat pump; the second testing part is located downstream of the second assembling part and is used to test the cooling water side components, and the second testing part includes a test module; the finished product part is located in the first The downstream of the second testing department is used to output finished products.

BRIEF DESCRIPTION OF DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
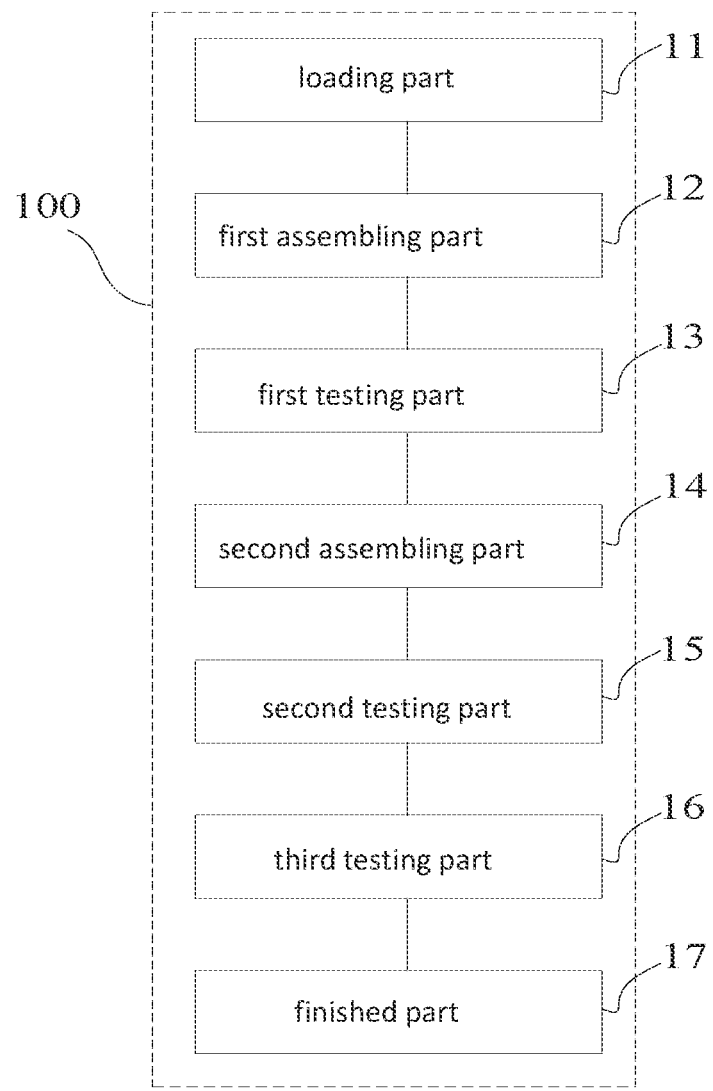
FIG. 1 is a schematic diagram of a fully automatic intelligent production line for a thermal management integrated module provided by an embodiment of the present application.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. The term "and/or" indicates embodiments of one or more of the listed elements, with "A and/or B" indicating embodiments of element A alone, element B alone, or elements A and B taken together.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

The computer readable medium may be a tangible computer readable storage medium storing the program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store program code for use by and/or in connection with an instruction execution system, apparatus, or device.

Program code for carrying out operations for aspects of the present invention may be written in any combination of one or more programming languages, including an object-oriented programming language such as MATLAB, Python, Ruby, R, Java, Java Script, Julia, Smalltalk, C++, C sharp, Lisp, Clojure, PHP or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). The computer program product may be shared, simultaneously serving multiple customers in a flexible, automated fashion.

The schematic flowchart diagrams and/or schematic block diagrams in the Figures illustrate the architecture, functionality, and operation of possible implementations. It should also be noted that, in some alternative implementations, the functions noted in the block may occur out of the order noted in the Figures. For example, two blocks shown in succession may in fact, be executed substantially concurrently, or the blocks may sometimes be executed in the reverse order, depending upon the functionality involved. Although various arrow types and line types may be employed in the flowchart and/or block diagrams, they are understood not to limit the scope of the corresponding embodiments. Indeed, some arrows or other connectors may be used to indicate only an exemplary logical flow of the depicted embodiment.

The description of elements in each figure may refer to elements of proceeding figures. Like numbers refer to like elements in all figures, including alternate embodiments of like elements.

The purpose of the present application is to provide a technical solution to solve the problems of low production efficiency and difficult control of production quality of heat pumps in current techniques.

Based on the above problems, the present application provides a fully automatic intelligent production line for a thermal management integrated module for assembling a heat pump, including:

The loading part is located at the beginning of the fully automatic intelligent production line of the thermal management integrated module;

The first assembling part, located downstream of the loading part, is used to assemble the refrigerant side parts of the heat pump;

a first testing part, located downstream of the first assembling part, for testing the refrigerant side components, the first testing part includes a testing module;

The second assembling part, located downstream of the loading part, is used to assemble the cooling water side components of the heat pump;

a second testing part, located downstream of the second assembling part, is used for testing the cooling water side components, and the second testing part includes a testing module;

The finished product section, located downstream of the second testing section, is used for outputting finished products.

Further, the test modules include:

A solenoid valve control device, connected with the solenoid valve in the heat pump, for controlling the solenoid valve;

An expansion valve control device, connected with the expansion valve in the heat pump, for controlling the expansion valve;

a ventilation device, connected with the heat pump, for feeding the test gas into the heat pump;

A leak detection device, connected to the heat pump and used to test the heat pump for leaks;

The flow detection device is connected with the heat pump and used to obtain the flow rate of the test gas.

Further, the test module further includes a storage module for storing the test program.

Further, the test module further includes a control module for acquiring the test program from the storage module and controlling the solenoid valve control device, the expansion valve control device, the ventilation device, the leak detection device and the flow detection device.

Further, the test module further includes a driving water pump control device, which is connected to the driving water pump in the heat pump and is used for controlling the driving water pump to perform a flow test of the heat pump.

Further, the ventilation device includes an inlet end and an outlet end, one side of the inlet end is connected to the gas source, the other side of the inlet end is connected to the first gas path and the second gas path, and the first gas path sequentially includes a high-pressure valve and a stop valve, The second gas path includes a low-pressure valve and a stop valve in turn, the first gas path and the second gas path are connected in parallel; one side of the outlet end is connected to the third gas path and the fourth gas path, the third gas path includes a stop valve, and the fourth gas path The circuit includes a stop valve and a flow meter in turn, and the third gas circuit and the fourth gas circuit are connected in parallel.

Further, a pressure sensor is also arranged between the inlet end and the gas source; in the first gas path, a pressure sensor is also arranged between the high-pressure valve and the shut-off valve; in the second gas passage, a pressure sensor is also arranged between the low-pressure valve and the shut-off valve. There are pressure sensors.

Further, a third testing part is further included between the second testing part and the finished product part, and the third testing part includes a visual inspection module.

Further, the first assembling part includes an expansion valve assembly module, a solenoid valve assembly module, a battery cooler assembly module, a heat exchanger assembly module and a first wire harness assembly module.

Further, the second assembling part includes a water-cooling manifold assembly module, a water pump assembly module, a multi-port valve assembly module, a kettle assembly module and a second wire harness assembly module.

To sum up, the present application provides a fully automatic intelligent production line for thermal management integrated modules, which improves the production efficiency of the heat pump through a flow-type assembly process and inserts a first test part and a second test part in the production process, so as to realize the Quality control of heat pump products.

The present invention will be described in detail below with reference to the specific embodiments shown in the accompanying drawings, but these embodiments do not limit the present invention, and those of ordinary skill in the art can make structural, method, or functional transformations according to these embodiments. All are included in the protection scope of the present invention.

For new energy vehicles, which are different from traditional automotive air conditioning systems, new energy vehicles mainly use heat pumps for thermal management. The main factor for the introduction of heat pumps in new energy vehicles is that pure electric vehicles or plug-in hybrid vehicles that support pure electric driving can no longer continue to use the engine as a stable heat source for heating. Therefore, most of today's new energy vehicles introduce heat pump systems.

The working principle of a heat pump is to transfer heat from a place with a low temperature to a place with a high temperature, so as to achieve the effect of cooling or heating. In order to achieve the above effects, heat pumps are usually designed to take into account both cooling and heating conditions. Generally, a heat pump is designed to include a plurality of valves, and the switching of the working mode of the heat pump is realized by switching the valves. In addition, the heat pump needs to inject a condensing agent, which can absorb ambient heat through the condensing agent to achieve cooling, or release heat into the cabin through the condensing agent, so as to realize the heating of the cabin inside the vehicle.

For heat pumps, the assembly structure is complex, and the production quality is difficult to control. To this end, the present application provides a fully automatic intelligent production line 100 of a thermal management integrated module, which is used to produce the heat pump 200, improve the production efficiency of the heat pump, and control the production quality of the heat pump.

The figures include an automatic intelligent production line 100 for thermal management integrated module, loading part 11, first assembling part 12, expansion valve assembly module 121, solenoid valve assembly module 122, battery cooler assembly module 123, heat exchanger assembly module 124, The first wiring harness assembly module 125, the first test part 13, the test module 131, the solenoid valve control device 1311, the expansion valve control device 1312, the ventilation device 1313, the high-pressure valve 1313a, the low-pressure valve 1313b, the stop valve 1313c, the flow meter 1313d, the pressure sensor 24, leak detection device 1314, flow detection device 1315, control module 1316, storage module 1317, drive water pump control device 1318, second assembling part 14, water-cooling manifold assembly module 141, water pump assembly module 142, multi-port valve assembly module 143, kettle assembly module 144, second wire harness assembly module 145, second testing part 15, third testing part 16, visual inspection module 161, finished product part 17; heat pump 200, first port 211, second port 212, third port 213, fourth port 214, fifth port 215, sixth port 216, first solenoid valve 221, first expansion valve 231, second expansion valve 232, third expansion valve 233, fourth expansion valve 234, fifth expansion valve expansion valve 235, sixth expansion valve 236, pressure sensor 24, ACC loop heat exchanger 25, LCC loop heat exchanger 26, and a battery cooler 27.

In FIG. 1, a schematic diagram of a fully automatic intelligent production line 100 of a thermal management integrated module provided by an embodiment of the present application is shown. As shown in FIG. 1, the fully automatic intelligent production line 100 of the thermal management integrated module provided by the embodiment of the present application includes a loading part 11, a first assembling part 12, a first testing part 13, a second assembling part 14, and a second testing part 15 And the finished product part 17.

In FIG. 1, a schematic diagram of a fully automatic intelligent production line 100 of a thermal management integrated module provided by an embodiment of the present application is shown. As shown in FIG. 1, the fully automatic intelligent production line 100 of the thermal management integrated module provided by the embodiment of the present application includes a loading part 11, a first assembling part 12, a first testing part 13, a second assembling part 14, and a second testing part 15, and the finished product part 17.

Wherein, the loading part 11 is located in the initial section of the fully automatic intelligent production line 100 of the integrated thermal management module. The first assembling part 12 is located downstream of the loading part 11 and is used for assembling the refrigerant-side components of the heat pump 200. The first testing part 13 is located downstream of the first assembling part 12 and is used for testing the refrigerant-side components. The first testing part 13 includes a testing module 131. The second assembling part 14 is located downstream of the loading part 11 and is used for assembling the cooling water side components of the heat pump 200. The second testing part 15 is located downstream of the second assembling part 14 and is used for testing the cooling water side components, and the second testing part 15 includes a testing module 131. The finished product part 17 is located downstream of the second testing part 15 for outputting the finished product.

According to the above description, the fully automatic intelligent production line 100 of the integrated thermal management module provided by the embodiment of the present application provides the loading part 11, and the loading part 11 conveys the various components used for assembling the heat pump 200 to the fully automatic intelligent production line 100 of the integrated thermal management integrated module, so as to realize The automatic feeding operation of the fully automatic intelligent production line 100 of the thermal management integrated module. In addition, the components provided by the loading part 11 for assembling the heat pump 200 are assembled by the first assembling part 12 to constitute the refrigerant-side components of the heat pump 200. After the assembly of the refrigerant-side components is completed, the second assembling part 14 completes the assembly of the cooling-water-side components of the heat pump 200. At this point, the overall assembly of the heat pump 200 is completed, and the finished product part 17 is provided to output the assembled finished heat pump 200. The present application provides a complete production process of the heat pump 200, which greatly improves the production efficiency of the heat pump 200.

The fully automatic intelligent production line 100 for the integrated thermal management module provided by the first embodiment of the present application is inserted into the first testing part 13 during the production process of the heat pump 200. After the assembly of the refrigerant side components of the heat pump 200 is completed, first test the refrigerant side components of the heat pump 200 through the first testing part 13. Only the refrigerant side components of the heat pump 200 that have passed the test can enter the fully automatic intelligent production line 100 of the thermal management integrated module. The next production step of 100, that is, only the refrigerant-side components of the heat pump 200 that pass the test can enter the second assembling part 14. In the present application, by setting the first testing part 13 downstream of the first assembling part 12, unqualified products can be found early, and subsequent further processing of unqualified refrigerant-side components of the heat pump is avoided, thereby improving the qualified rate of heat pump 200 products and improving productivity.

The fully automatic intelligent production line 100 of the integrated thermal management module provided by the embodiment of the present application is provided with a second testing part 15 downstream of the second assembling part 14, and the cooling water side components of the heat pump 200 are tested by the second testing part 15. Only the heat pump 200 that passes the test of the second testing part 15 can be regarded as a qualified heat pump 200 finished product.

As an optional implementation manner, the fully automatic intelligent production line 100 of the integrated thermal management module provided in the embodiment of the present application further includes a third testing part 16. The third testing part 16 includes a visual inspection module 161, which judges whether the product is qualified or not based on the appearance of the product. The third testing part 16 is located between the second testing part 15 and the finished product part 17.

In the fully automatic intelligent production line 100 of the integrated thermal management module provided by the embodiment of the present application, the refrigerant side components of the heat pump 200 are tested by the first testing unit part 13, so as to detect problems as early as possible, avoid unnecessary processing, and reduce production losses. In addition, the cooling water side components of the heat pump 200 are tested by the second testing part 15, so that the quality inspection of the heat pump 200 products can be completed in the production process, and the production quality of the heat pump 200 products can be controlled.

As an optional implementation manner, in the embodiment of the present application, the first testing part 13 includes a testing module 131, and the testing module 131 can be used to test whether the refrigerant-side components of the heat pump 200 are qualified. When the test module 131 performs the qualification test on the refrigerant-side components of the heat pump 200, it is necessary to test the tightness of the refrigerant-side components. As for the refrigerant-side component, the factor affecting its sealing performance is whether the various valves in the refrigerant-side component can function well. In this regard, the test module 131 provided in this embodiment of the present application checks whether each valve in the refrigerant-side component may leak.

In the refrigerant-side components of the heat pump 200, a solenoid valve and/or an expansion valve are included.

Figure 2:
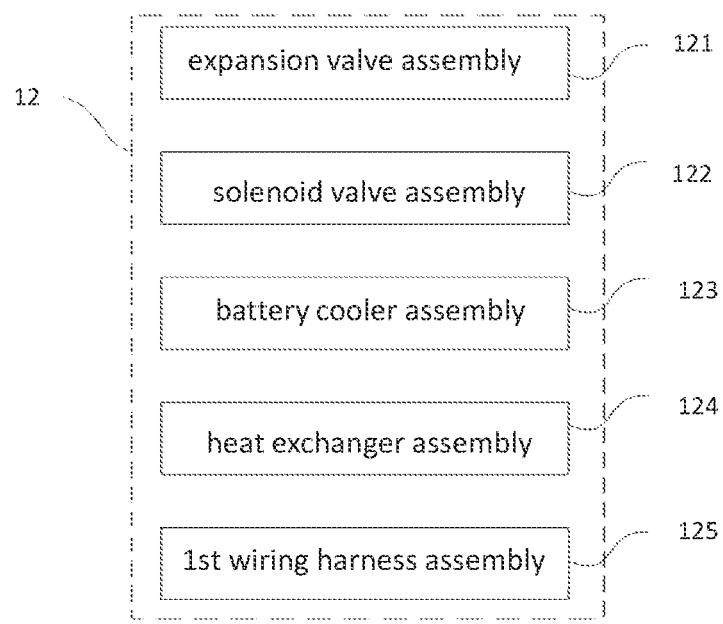
FIG. 2 is a schematic diagram of a first assembling part provided in an embodiment of the present application.

As shown in FIG. 2, as an optional implementation manner, in the fully automatic intelligent production line 100 of the thermal management integrated module provided by the embodiment of the present application, the first assembling part 12 includes an expansion valve assembly module 121 and a solenoid valve assembly module 122. Specifically, the expansion valve assembly module 121 is used to provide the expansion valve assembly during the assembly process of the heat pump 200, and the solenoid valve assembly module 122 is used to provide the electromagnetic valve assembly during the assembly process of the heat pump 200.

As an optional implementation manner, the first assembling part 12 further includes a battery cooler assembly module 123, a heat exchanger assembly module 124 and a first wiring harness assembly module 125.

Among them, the battery cooler assembly module 123 is used to provide assembly of the battery cooler 27 during the assembly process of the heat pump 200, the heat exchanger assembly module 124 is used to provide heat exchanger assembly during the assembly process of the heat pump 200, and the first wiring harness assembly module 125 is used for a first harness assembly is provided during the heat pump 200 assembly process. The heat exchanger assembly module 124 includes a circuit heat exchanger 25 for assembling an ACC (gas-liquid separator) and a LCC loop heat exchanger 26 for an LCC (waste heat recovery).

As an optional implementation manner, the first assembling part 12 further includes an assembly module of the first pressure sensor 24.

As an optional implementation manner, the assembly sequence of each element in the refrigerant-side component by the first assembly part 12 may be arranged according to actual requirements, so that an assembly sequence with the best efficiency may be selected.

As an optional implementation manner, in this embodiment of the present application, the heat pump 200 includes a refrigerant side. The side of the refrigerant includes an expansion valve, a solenoid valve, a battery cooler 27, a heat exchanger, a pressure sensor 24, and an installation hole for the first wire harness.

As an optional implementation manner, the expansion valve assembly module 121 is located at the starting end of the first assembling part 12 and is used to install the expansion valve in the installation hole of the expansion valve. The first pressure sensor 24 assembly module is located downstream of the expansion valve assembly module 121 and is used to install the pressure sensor 24 in the installation hole of the pressure sensor 24. The solenoid valve assembling module 122 is located downstream of the first pressure sensor 24 assembling module and is used to install the solenoid valve in the solenoid valve mounting hole. The battery cooler assembly module 123 is located downstream of the solenoid valve assembly module 122 and is used for installing the battery cooler 27 in the mounting hole of the battery cooler 27. The heat exchanger assembly module 124 is located downstream of the battery cooler assembly module 123 and is used for installing the ACC loop heat exchanger 25 and the LCC loop heat exchanger 26 in the heat exchanger installation holes, respectively.

Figure 3:
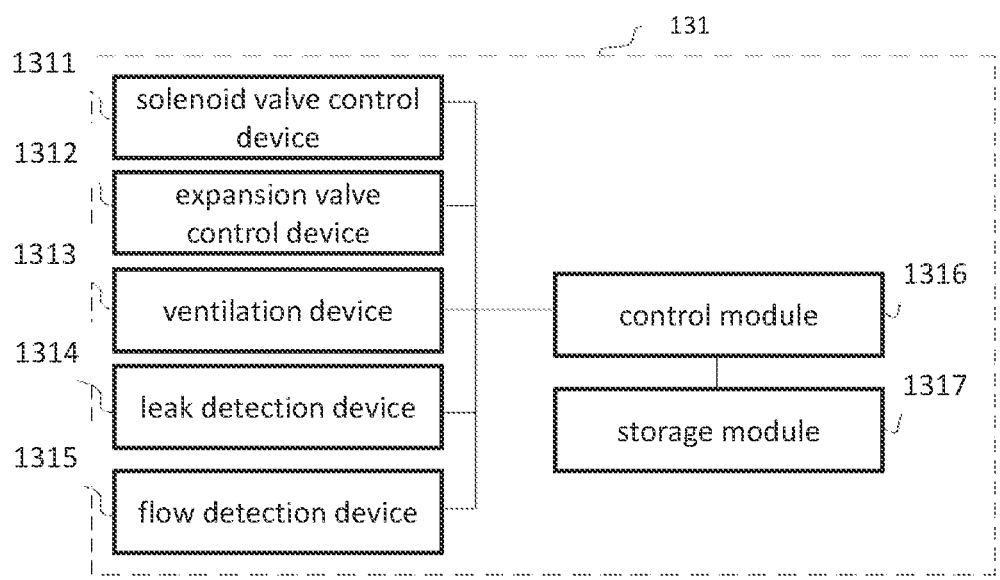
FIG. 3 is a schematic diagram of a test module provided by an embodiment of the present application.

As shown in FIG. 3, as an optional implementation manner, the test module 131 provided in this embodiment of the present application includes: a solenoid valve control device 1311, an expansion valve control device 1312, a ventilation device 1313, a leak detection device 1314, and a flow detection device 1315.

The solenoid valve control device 1311 is connected to the solenoid valve in the heat pump 200 to control the solenoid valve when the first testing part 13 performs the product qualification test on the refrigerant side components of the heat pump 200. The expansion valve control device 1312 is connected to the expansion valve in the heat pump 200 for controlling the expansion valve. The ventilation device 1313 is connected to the heat pump 200 and is used for feeding the test gas into the heat pump 200. The leak detection device 1314 is connected to the heat pump 200 and is used to test whether the heat pump 200 leaks. The flow detection device 1315 is connected to the heat pump 200 and used to obtain the flow rate of the test gas.

As an optional implementation manner, in the fully automatic intelligent production line 100 of the thermal management integrated module provided by the embodiment of the present application, the test module 131 further includes a storage module 1317, and the storage module 1317 is used for storing the test program.

As an optional implementation manner, in the fully automatic intelligent production line 100 of the thermal management integrated module provided by the embodiment of the present application, the test module 131 further includes a control module 1316 for acquiring the test program from the storage module 1317 and controlling the solenoid valve control device 1311, expansion valve control device 1312, ventilation device 1313, leak detection device 1314 and flow detection device 1315.

As an optional implementation manner, when using the test module 131 provided in the embodiment of the present application, if there is only one valve in a pipeline of the refrigerant side component, it can be controlled by the solenoid valve control device 1311 or the expansion valve control device 1312. The expansion valve control device 1312 closes the valve and ventilates from the pipeline located on one side of the valve and uses the leak detection device 1314 to detect the air pressure change in the pipeline within a period of time after venting, thereby judging the tightness of the valve.

Secondly, if there are at least two valves in a pipeline in the refrigerant side component, for the convenience of description, in this application, based on the direction of ventilation in the pipeline during the test, the valve that the gas in the pipeline reaches first as the valve of the previous stage, the valve that arrives after the gas is the valve of the second stage, which can also be called the valve of the rear stage.

For the situation that there are at least two valves in a pipeline in the refrigerant side component, the test method when there is only one valve in the pipeline can be used for reference. When carrying out the test, if it is determined that the sealing performance of the valve of the front stage is qualified, open the valve of the front stage, ventilate the pipeline, and use the leak detection device 1314 to test the sealing performance of the valve of the rear stage in the pipeline. And so on, it is possible to test the tightness of each valve in the refrigerant side part.

In order to more specifically describe the use method of the test module 131 provided in the embodiment of the present application, the test process thereof will be described below with reference to specific refrigerant-side components.

Figure 4:
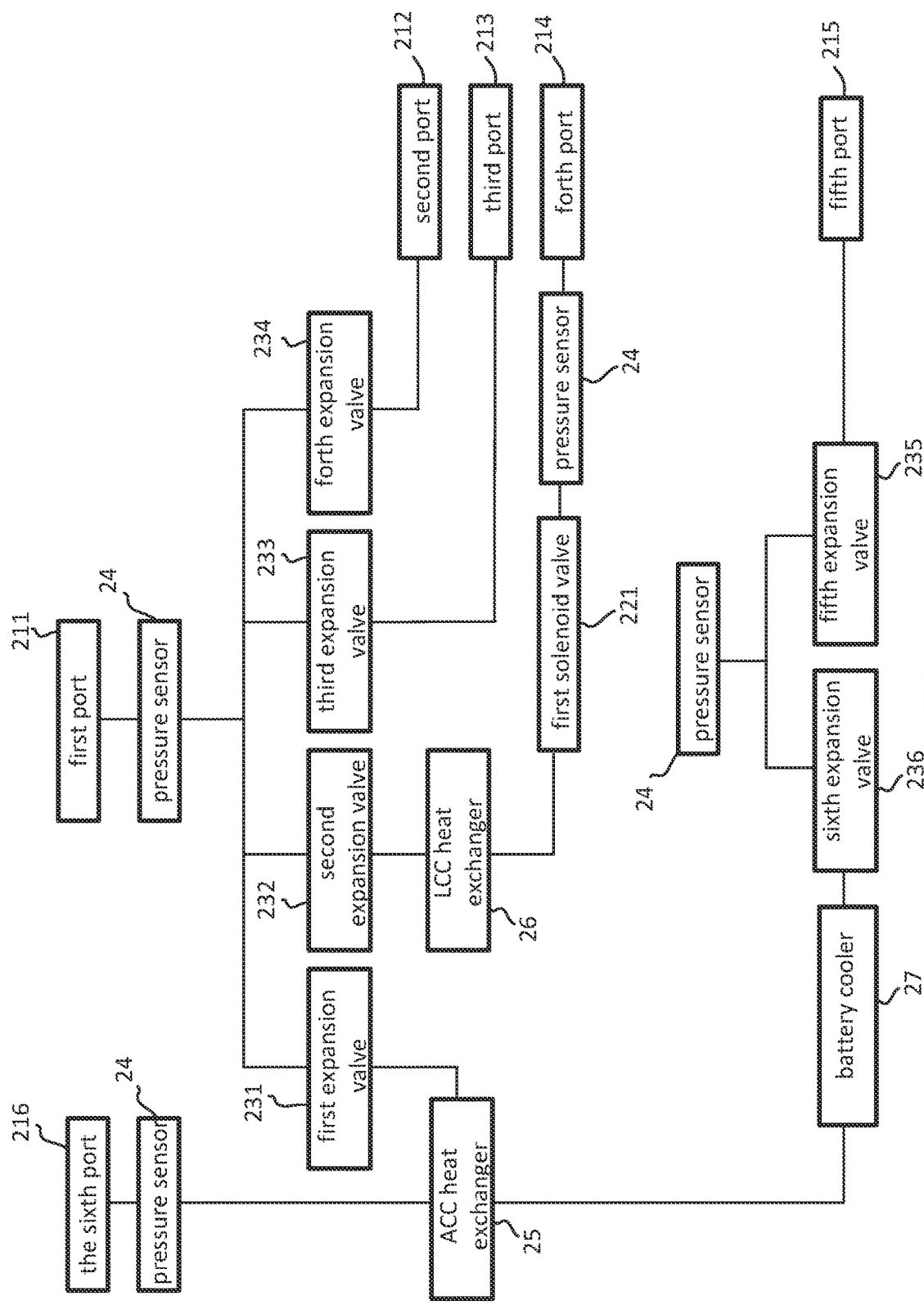
FIG. 4 is a schematic diagram of a refrigerant-side component of a heat pump according to an embodiment of the present application.

The first assembling part 12 provided by the embodiment of the present application can be used to assemble the refrigerant side components. Specifically, as shown in FIG. 4, it shows a schematic structural diagram of the refrigerant side components of the heat pump 200 provided by the embodiment of the present application. For any heat pump 200, the refrigerant side component includes multiple ports. For the outside of the heat pump 200, each port is connected to the pipe of the external refrigeration circuit, and the on-off of each port is controlled by a valve; for the inside of the heat pump 200, each port cooperates with each other to form different circuits, and the refrigerant circulates in each circuit, Thus, part of the functions of the heat pump 200 are realized.

As shown in FIG. 4, as an optional implementation manner, the refrigerant-side components of the heat pump 200 provided in the embodiments of the present application include a first port 211, a second port 212, a third port 213, and a fourth port 214, a fifth port 215, and a sixth port 216, each of which is connected to form a loop through the internal pipeline of the heat pump 200. The first port 211 is connected with the second port 212 to form a first loop, the first port 211 is connected with the third port 213 to form a second loop, the first port 211 is connected with the fourth port 214 to form a third loop, and the first port 211 is connected with the fifth port 215 to form a fourth loop. In addition to the first port 211, a connection is made between the third circuit and the fourth circuit by pipes, so that the fourth port 214 can communicate with the fifth port 215. For convenience of description, the pipe connecting the third circuit and the fourth circuit is referred to as the first pipe. In addition, the first port 211 is connected with the sixth port 216 to form a fifth loop, and the sixth port 216 is also connected with the fifth port 215 to form a sixth loop.

According to the above description, it can be known that the general circuit structure of the refrigerant-side components of the heat pump 200 provided in the embodiments of the present application is provided with an expansion valve and/or a solenoid valve in each circuit structure to control the on-off of the circuit.

As an optional implementation manner, in the embodiment of the present application, the refrigerant-side component further includes a first solenoid valve 221, a first expansion valve 231, a second expansion valve 232, a third expansion valve 233, and a fourth expansion valve 234, the fifth expansion valve 235, the sixth expansion valve 236.

As an optional implementation manner, in the embodiment of the present application, a fourth expansion valve 234 is provided at the second port 212 to control the on-off of the first circuit. A third expansion valve 233 is provided at the third port 213 to control the on-off of the second circuit.

As an optional implementation manner, in the third circuit, the first solenoid valve 221 is provided near the fourth port 214, the second expansion valve 232 is provided near the first port 211, the first solenoid valve 221 and the second expansion valve 232 are provided near the first port 211 The two expansion valves 232 cooperate with each other to control the on-off of the third circuit.

As an optional implementation manner, in the fourth circuit, a fifth expansion valve 235 is provided near the fifth port 215, and a first expansion valve 231 is provided near the first port 211.

In the embodiment of the present application, the first expansion valve 231 is also located in the fifth circuit, that is, the first end of the first expansion valve 231 is connected to the first port 211, and the second end of the first expansion valve 231 is connected to the sixth port 216 connections.

As an optional implementation manner, in the sixth circuit, a fifth expansion valve 235 is provided near the fifth port 215, and a sixth expansion valve 236 is provided near the sixth port 216. Specifically, in the fourth circuit and the sixth circuit, the two circuits share the fifth expansion valve 235 and the sixth expansion valve 236, that is, the fifth expansion valve 235 can only affect the on-off state of the fourth circuit and the sixth circuit, the sixth expansion valve 236 can only affect the on-off state of the fourth circuit and the sixth circuit.

As an optional implementation manner, in the embodiment of the present application, the first end of the first pipeline is connected to the third circuit, and the connection point is located between the first solenoid valve 221 and the second expansion valve 232. The second end of the first pipeline is connected to the fourth circuit, and the connection point is located between the fifth expansion valve 235 and the sixth expansion valve 236.

According to the above description, it can be seen that the internal pipeline connection status of the refrigerant-side components of the heat pump 200 produced by the fully automatic intelligent production line 100 of the thermal management integrated module provided by the embodiment of the present application, the first testing part 13 provided by the embodiment of the present application is aimed at the heat pump 200. The refrigerant side components of the product are subject to product qualification testing.

As an optional implementation manner, in the embodiment of the present application, when the test module 131 detects the refrigerant-side components, the leak detection device 1314 is used to first detect the valve of the front stage, and then the leakage detection device 1314 is used to detect the rear valve. level valves are tested.

For example, take the first solenoid valve 221 as the front stage, close the first solenoid valve 221, ventilate the refrigerant-side components through the fourth port 214, and detect that the pipeline from the fourth port 214 to the first solenoid valve 221 is ventilated for a certain period of time The air pressure inside changes, so as to judge whether the sealing performance of the first solenoid valve 221 is qualified.

In addition, the fifth expansion valve 235 can also be used as the front stage, the fifth expansion valve 235 can be closed, the refrigerant side components can be ventilated through the fifth port 215, and the pipeline from the fifth port 215 to the fifth expansion valve 235 can be detected after ventilating. The air pressure changes within a certain period of time, so as to judge whether the sealing performance of the fifth expansion valve 235 is qualified.

After the tightness detection of the first solenoid valve 221 and the fifth expansion valve 235 is completed, a test can be performed on the subsequent valve of the fifth expansion valve 235. As for the fifth expansion valve 235, since the third circuit is connected to the fourth circuit through the first pipeline, the second expansion valve 232 can be used as the rear stage of the fifth expansion valve 235 through the first pipeline, and the first solenoid valve 221 is also It can be used as the rear stage of the fifth expansion valve 235 (since the first expansion valve 231 has been tested when it is used as the front stage, the tightness of the first solenoid valve 221 will not be tested here). In addition, in the sixth circuit, the sixth expansion valve 236 may serve as a subsequent stage of the fifth expansion valve 235.

The second expansion valve 232 and the sixth expansion valve 236, which are the subsequent stages, are detected. Open the fifth expansion valve 235, ventilate the refrigerant-side components through the fifth port 215, and detect the air pressure change in the pipeline from the fifth port 215 to the second expansion valve 232 and the sixth expansion valve 236 within a certain period of time after venting, so as to It is judged whether the sealing performance of the second expansion valve 232 and the sixth expansion valve 236 is acceptable.

As an optional implementation manner, in order to further determine which of the second expansion valve 232 and the sixth expansion valve 236 is unqualified in tightness, the leak detection device 1314 may be used to detect the sixth port 216 and the first port 211 respectively. If the pressure at the sixth port 216 exceeds the preset pressure threshold, it is determined that the sealing performance of the sixth expansion valve 236 is unqualified. Similarly, if the pressure at the first port 211 exceeds the preset pressure threshold, it is determined that the sealing performance of the first expansion valve 231 is unqualified.

According to the above description, the test module 131 provided in this embodiment of the present application has tested the first solenoid valve 221, the second expansion valve 232, the fifth expansion valve 235, and the sixth expansion valve 236 in the refrigerant-side components. Next, the remaining first expansion valve 231, third expansion valve 233, and fourth expansion valve 234 are tested.

As an optional implementation manner, the first expansion valve 231, the third expansion valve 233, and the fourth expansion valve 234 may be closed, and the refrigerant-side component may be ventilated from the first port 211, thereby simultaneously ventilating the first expansion valve 231, the third expansion valve 233 and the fourth expansion valve 234 are detected to improve the detection efficiency. After detecting the air pressure change of the first port 211 within a certain period of time, if the air pressure change is within a preset range, the first expansion valve 231, the third expansion valve 233, and the fourth expansion valve 234 are qualified in tightness. If the change in air pressure exceeds the preset range, at least one valve among the first expansion valve 231, the third expansion valve 233 and the fourth expansion valve 234 is unqualified. For further identification, the air pressures of the second port 212, the third port 213 and the sixth port 216 are respectively detected. When the pressure of the second port 212 exceeds the set range, the fourth expansion valve 234 leaks, and the pressure of the third port 213 exceeds the set range. When the pressure of the sixth port 216 exceeds the set range, the third expansion valve 233 leaks, and when the pressure of the sixth port 216 exceeds the set range, the first expansion valve 231 leaks.

As an optional implementation manner, the test module 131 may also test the internal flow rate of the refrigerant-side component.

Figure 5:
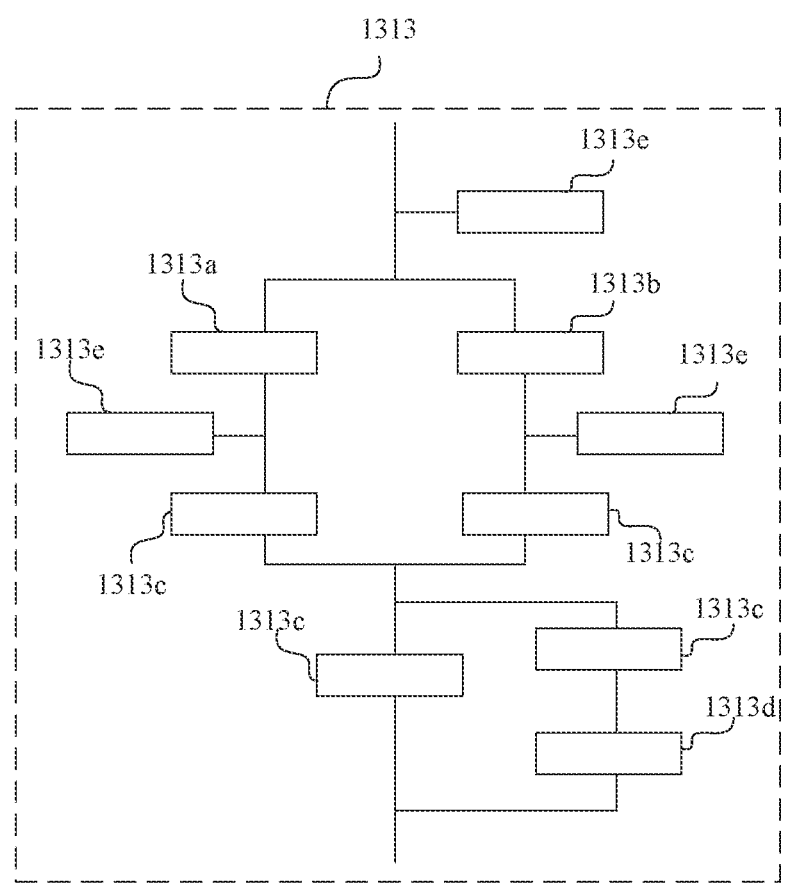
FIG. 5 is a schematic diagram of a ventilation device provided by an embodiment of the present application.

As shown in FIG. 5, it shows a schematic diagram of the ventilation device 1313 provided in this embodiment of the present application. The ventilation device 1313 includes an inlet end and an outlet end, one side of the inlet end is connected to the air source, and the other side of the inlet end is connected to the first air passage and the second air passage.

The first gas path includes a high-pressure valve 1313*a* and a stop valve 1313*c* in sequence, the second gas path includes a low-pressure valve 1313*b* and a stop valve 1313*c* in sequence, the first gas path and the second gas path are connected in parallel; one side of the outlet end is connected to the third gas path The third gas path includes a stop valve 1313*c*, the fourth gas path includes a stop valve 1313*c* and a flow meter 1313*d* in turn, and the third gas path and the fourth gas path are connected in parallel.

Specifically, both the high-pressure valve 1313*a* and the low-pressure valve 1313*b* can be used to adjust the gas flow of the ventilation device 1313, the difference being that the gas flow adjustment range of the high-pressure valve 1313*a* is higher than that of the low-pressure valve 1313*b*. Therefore, through the cooperation of the high-pressure valve 1313*a* and the low-pressure valve 1313*b*, precise control of the gas flow rate of the ventilation device 1313 can be achieved.

As an optional implementation manner, in the embodiment of the present application, a pressure sensor 1313*e* is further provided between the inlet end of the ventilation device 1313 and the air source. Specifically, in the first gas path, a pressure sensor 1313*e* is further provided between the high-pressure valve 1313*a* and the cutoff valve 1313*c*, and in the second gas path, a pressure sensor 1313*e* is further provided between the low-pressure valve 1313*b* and the cutoff valve 1313*c*.

As an optional implementation, when using the test module 131 provided in the embodiment of the present application to perform a flow test on the refrigerant-side component, the flow of each circuit in the refrigerant-side component is obtained, and the flow rate and the flow rate are set within a range. Compare and judge whether the flow in each circuit is normal.

Specifically, in the embodiment of the present application, the following steps are required to perform the flow test on the refrigerant-side component:

First close all valves (including solenoid valves and expansion valves) in the refrigerant side components;

The outlet end of the ventilation device 1313 in the test module 131 is connected to the first port 211, and a certain amount of gas is introduced into the refrigerant-side component from the first port 211.

Open the first expansion valve 231, use the flow detection device 1315 to detect and record the gas flow in the fifth circuit, and close the first expansion valve 231 after the recording is completed.

Open the third expansion valve 233, use the flow detection device 1315 to detect and record the gas flow in the second circuit, and close the third expansion valve 233 after the recording is completed.

Open the fourth expansion valve 234, use the flow detection device 1315 to detect and record the gas flow in the first circuit, and close the fourth expansion valve 234 after the recording is completed.

Open the second expansion valve 232 and the first solenoid valve 221, use the flow detection device 1315 to detect and record the gas flow in the third circuit, and close the second expansion valve 232 after the recording is completed.

The outlet end of the breather 1313 is disconnected from the first port 211, and the outlet end is connected to the fourth port 214, and a fixed amount of gas is introduced into the refrigerant-side member from the fourth port 214.

Open the fifth expansion valve 235, use the flow detection device 1315 to detect and record the flow from the fourth port 214 to the first solenoid valve 221 to the fifth expansion valve 235, and close the fifth expansion valve 235 after the recording is completed.

Open the sixth expansion valve 236 and use the flow detection device 1315 to detect and record the flow of the circuit from the fourth port 214 to the sixth expansion valve 236 and then to the sixth port 216 and record.

Compare the flow rate recorded above with the flow rate setting range to determine whether the flow rate in each circuit is normal.

Figure 6:
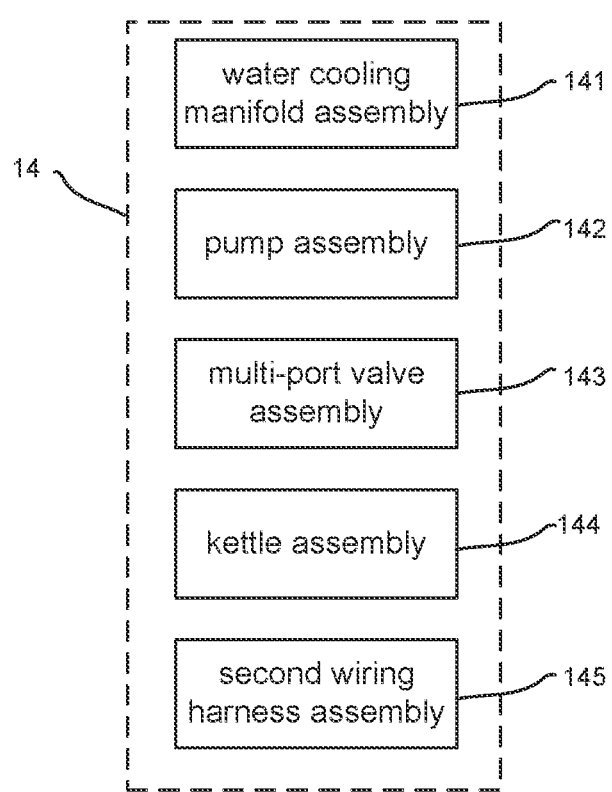
FIG. 6 is a schematic diagram of a second assembling part provided in an embodiment of the present application.

As an optional implementation manner, the second assembling part 14 provided in the embodiment of the present application is used to assemble the cooling water side components of the heat pump 200. Specifically, as shown in FIG. 6, the second assembling part 14 includes a water-cooling manifold assembly module 141, a water pump assembly module 142, a multi-port valve assembly module 143, a kettle assembly module 144, a second wire harness assembly module 145, a second pressure transmission Sense assembly module.

As an optional implementation manner, the heat pump 200 includes a cooling water side surface, and the cooling water side surface includes installation holes for a water-cooling manifold, a water pump, a pressure sensor 24 and a water valve for installing cooling water side components.

As an optional implementation manner, the water-cooling manifold assembly module 141 is located at the starting end of the second assembling part 14 and is used for installing the water-cooling manifold in the water-cooling manifold installation hole of the heat pump 200. The water pump assembly module 142 is located downstream of the water-cooling manifold assembly module 141 and is used for assembling the water pump in the water pump installation hole on the side of the cooling water. The second pressure sensor assembly module is located downstream of the water pump assembly module 142 and is used for installing the pressure sensor 24 in the installation hole of the pressure sensor 24 on the side of the cooling water. The multi-port valve assembly module 143 is located downstream of the second pressure sensing assembly module and is used for installing the multi-port valve in the water valve mounting hole position on the side of the cooling water. The kettle assembling module 144 is located downstream of the multi-port valve assembly module 143 and is used to install the kettle in the kettle mounting hole on the side of the refrigerated water. The second wire harness assembly module 145 is located downstream of the kettle assembly module 144 for assembling the wire harness to the cooling water side of the heat pump 200.

As an optional implementation manner, the second testing part 15 includes a testing module 131, and the testing module 131 can test the cooling water side components.

Figure 7:
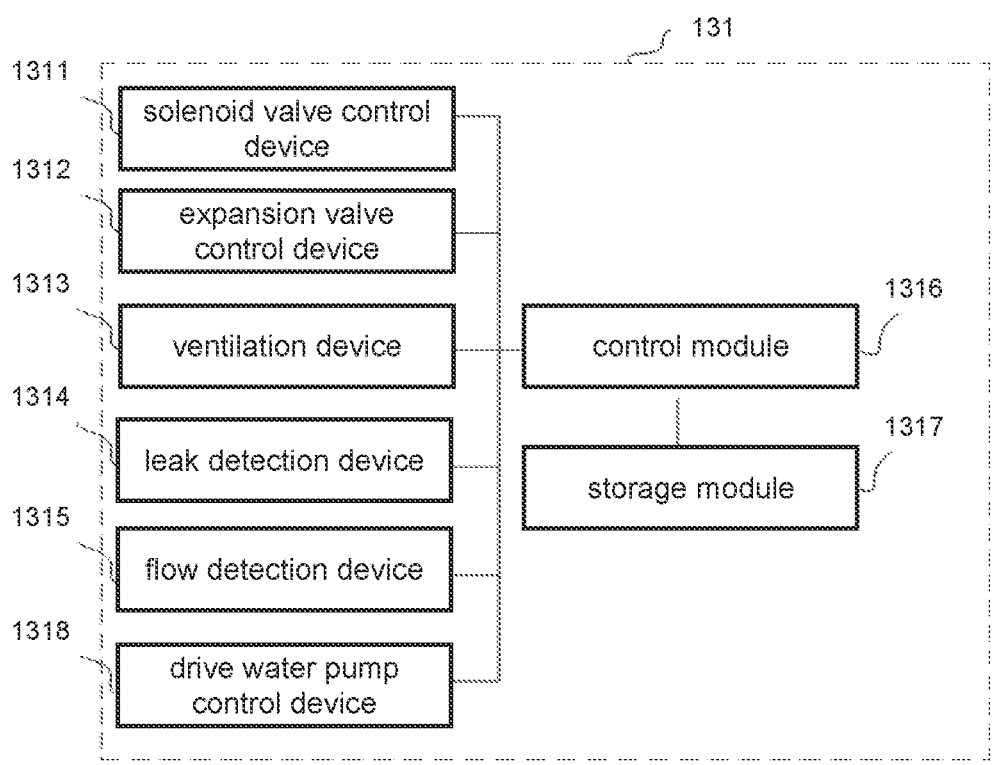
FIG. 7 is a schematic diagram of a test module provided by another embodiment of the present application.

As shown in FIG. 7, as an optional implementation manner, in this embodiment of the present application, the test module 131 further includes a driving water pump control device 1318, which is connected to the drive water pump in the heat pump 200 and is used to control the driving water pump to perform the heat pump 200 flow test.

As an optional implementation manner, the test module 131 provided in this embodiment of the present application tests the cooling water side components, including the following steps:

S210, detect whether the passage of the driving water pump is unobstructed;

S220, pressurize the circuits in a refrigeration water side component respectively, read the port pressure value after the pressure is stable, compare the pressure value with the pressure setting value, and determine whether external leakage occurs;

S230, pressurize a circuit in one refrigeration water side component, detect the leakage value of other circuits, compare the leakage value with the leakage setting value, and determine whether internal leakage occurs;

S240, ventilate a circuit in a refrigeration water side component, detect the gas flow in the circuit, compare the gas flow with a flow set value, and determine whether the flow is normal.

As an optional implementation manner, before performing step S230, repeat step S220 until all circuits are tested, and before performing step S240, repeat step S230 until all circuits are tested. Repeat step S240 until all loops are tested.

Figure 8:
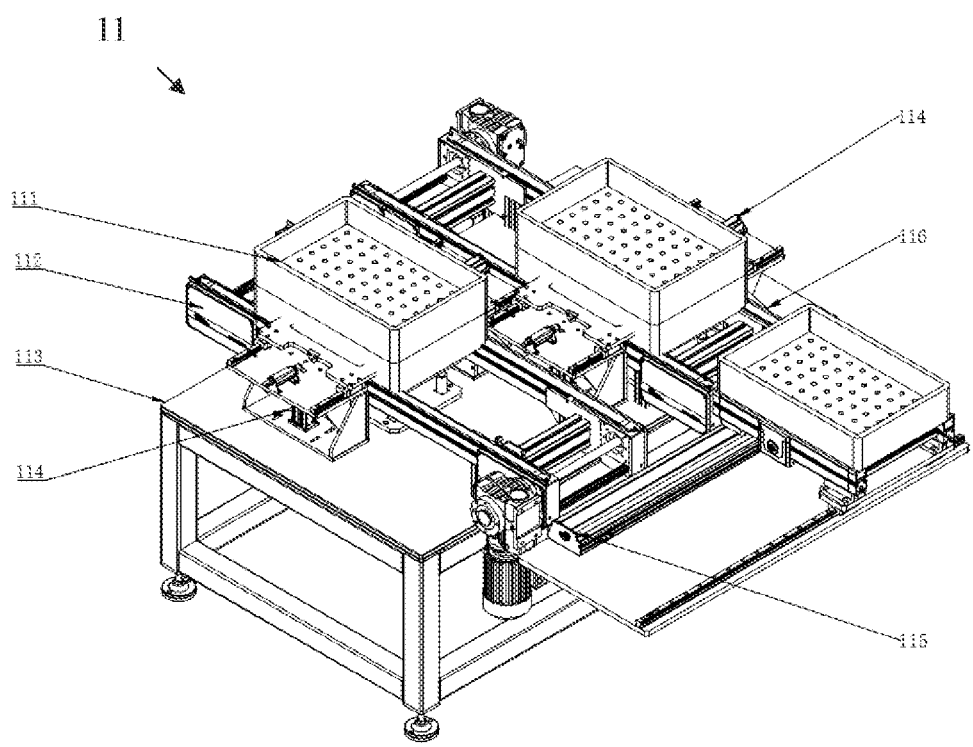
FIG. 8 is a perspective drawing illustrating one embodiment of a loading part.

FIG. 8 is a perspective drawing illustrating one embodiment of the loading part 11. The loading part 11 includes material boxes 111, a material feeding conveyor belt 112, a platform 113, material distribution box mechanisms 114, a horizontal module 115, and a material feeding conveyor belt 116. The material boxes 111 are filled with material and are stacked to prevent the material boxes 111 from reaching the material feeding conveyor belt 116. A material distribution box mechanism 114 lifts a top material box 111 allowing the bottom material box 111 to be transported by the material feeding conveyor belt 112 to the horizontal module 115 which empties the material. The material feeding conveyor belt 112 moves the material box 111 to a material distribution box mechanisms 114 that lifts the now empty material box 111 and stacks the empty material box 111 with another empty material box 111. When all of the upper material boxes 111 are used, the material feeding conveyor belt 112 transports the empty material boxes 111 to an unloading location.

Figure 9:
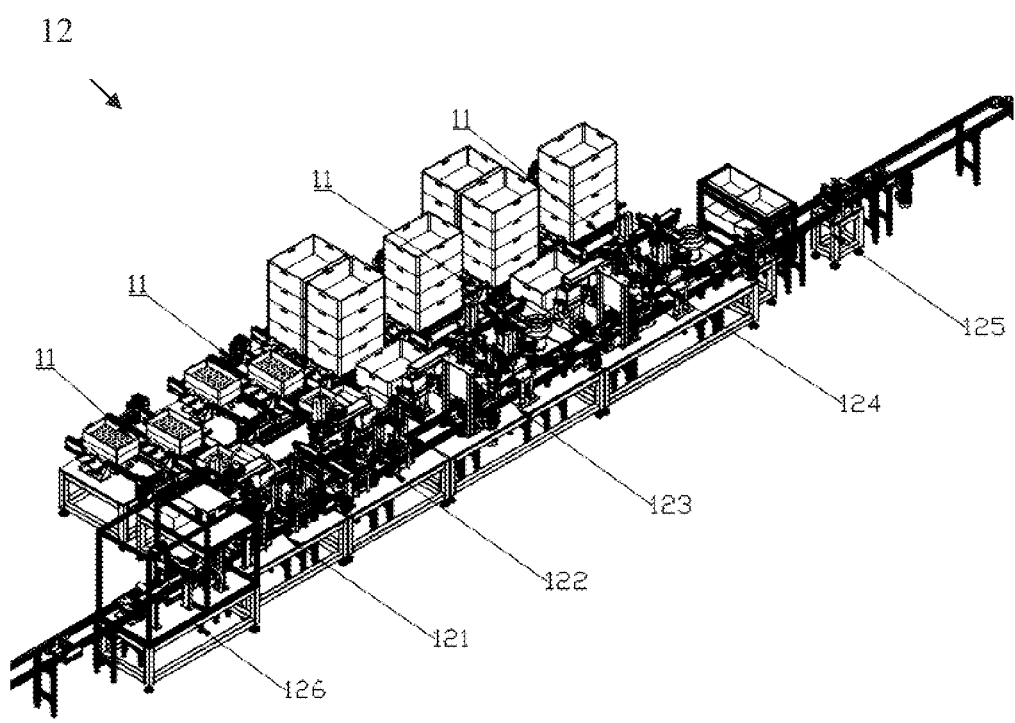
FIG. 9 is a perspective drawing illustrating one embodiment of a first assembling part.

FIG. 9 is a perspective drawing illustrating one embodiment of a first assembling part 12. The first assembling part 12 includes at least one loading part 11, a manual loading area 126, an expansion valve assembly module 121, an electromagnetic valve assembly 122, a battery cooler assembly module 123, a heat exchanger assembly module 124, and a first wiring harness assembly module 125.

Figure 10:
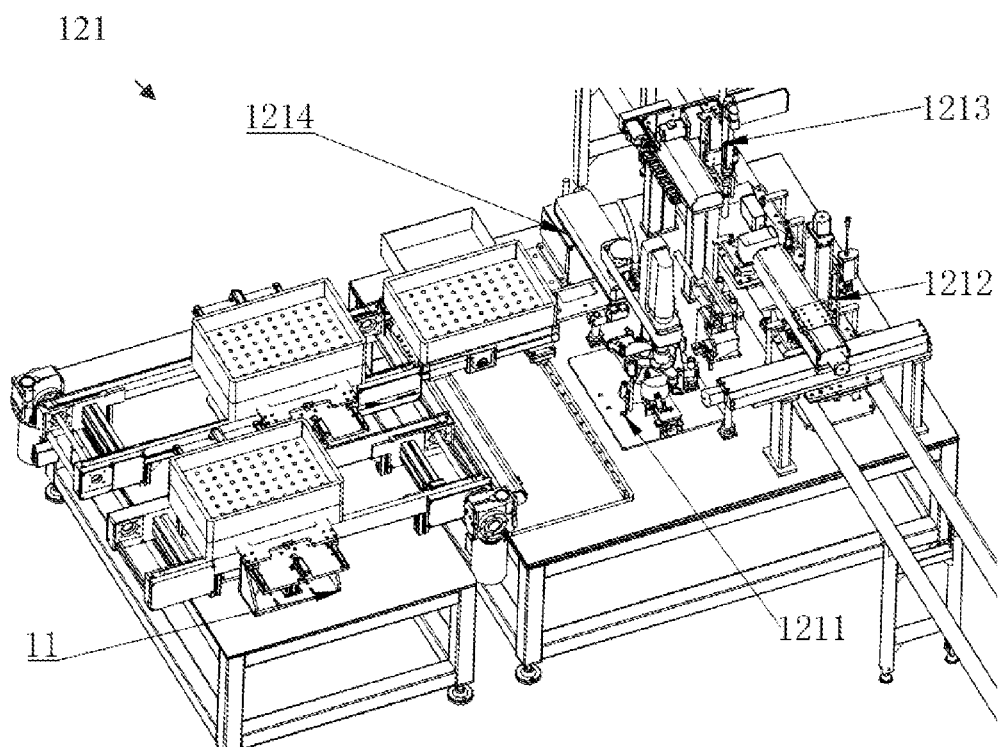
FIG. 10 is a perspective drawing illustrating one embodiment of a valve assembly module.

FIG. 10 is a perspective drawing illustrating one embodiment of a valve assembly module 121. The valve assembly module 121 includes a loading part 11, an oiling mechanism 1211, a three-axis pre-tightening robot 1212, a three-axis tightening mechanism 1213, and a reclaiming robot 1214. The reclaiming robot 1214 takes material to the oiling mechanism 1211 which oils the material. The three-axis pre-tightening robot 1212 pre-tightens the material to a substrate. The three-axis tightening mechanism 1213 tightens the material.

Figure 11:
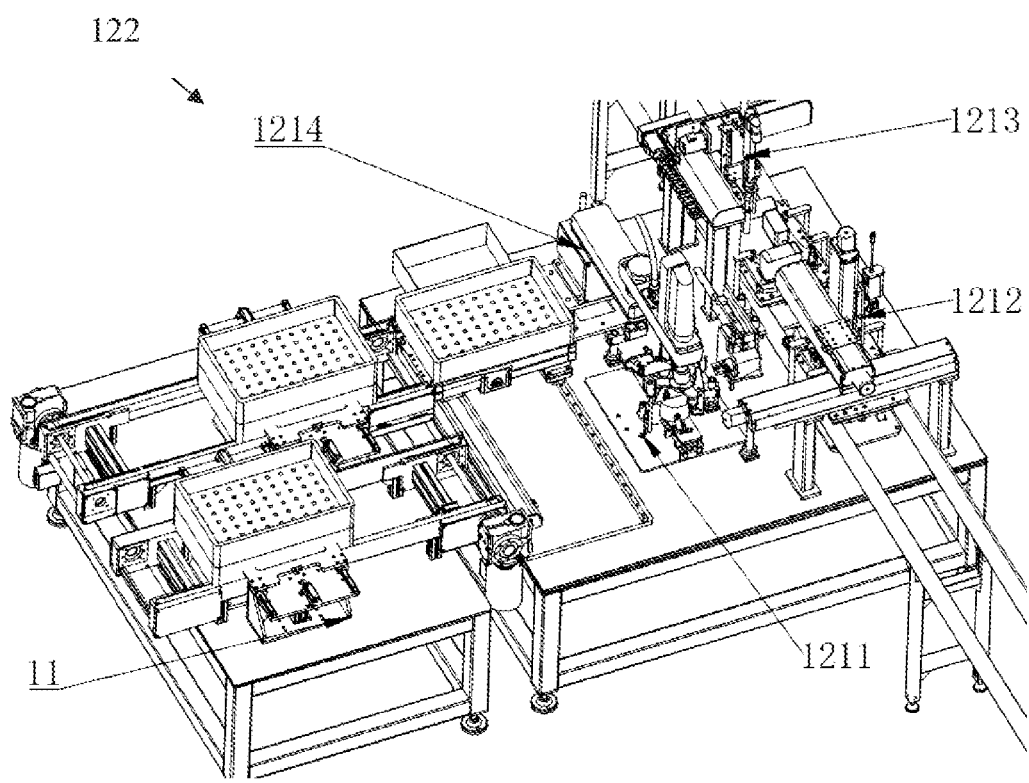
FIG. 11 is a perspective drawing illustrating one embodiment of an electromagnetic valve assembly module.

FIG. 11 is a perspective drawing illustrating one embodiment of an electromagnetic valve assembly module 122. The electromagnetic valve assembly module 122 is similar to the value assembly module 121. The electromagnetic valve assembly module 122 includes a loading part 11, an oiling mechanism 1211, a three-axis pre-tightening robot 1212, a three-axis tightening mechanism 1213, and a reclaiming robot 1214. The reclaiming robot 1214 takes material to the oiling mechanism 1211 which oils the material. The three-axis pre-tightening robot 1212 pre-tightens the material to a substrate. The three-axis tightening mechanism 1213 tightens the material.

Figure 12:
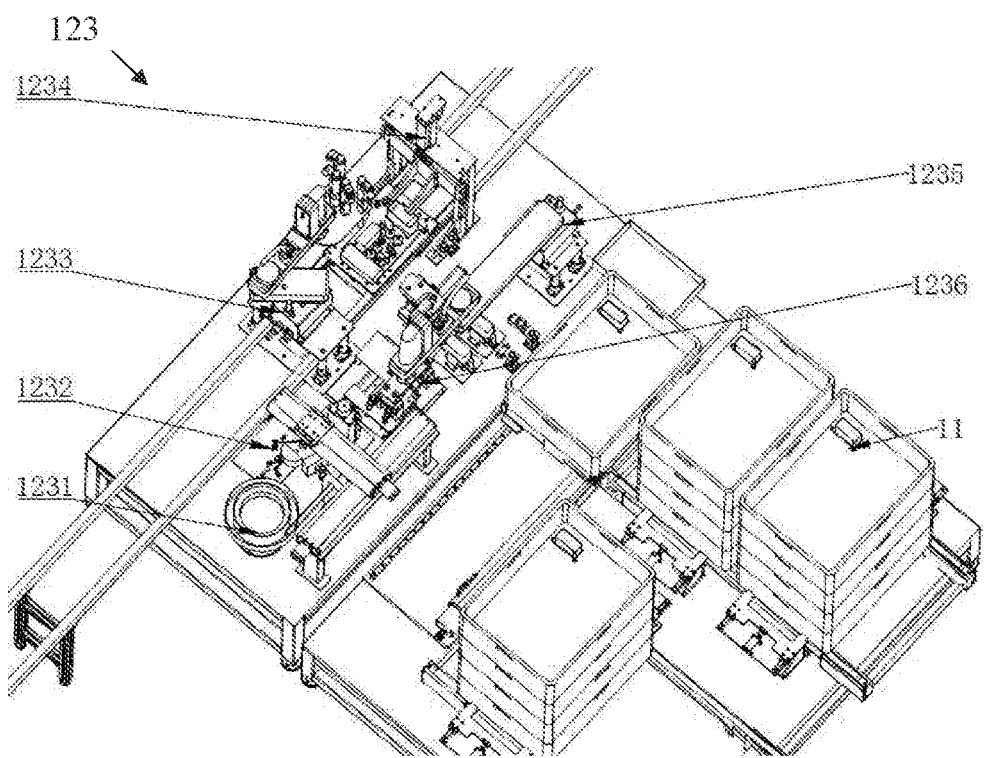
FIG. 12 is a perspective drawing illustrating one embodiment of a battery cooler assembly module.

FIG. 12 is a perspective drawing illustrating one embodiment of a battery cooler assembly module 123. The battery cooler assembly module 123 includes a loading part 11, a vibration disk 1231, an oil coating mechanism 1232, a screw tightening robot 1233, a pre-pressing mechanism 1234, a material picking robot 1235, and an O-ring loading robot 1236.

The O-ring loading robot 1236 takes an O-ring from the vibration disk 1231 to the oil coating mechanism 1232, which coats the O-ring in oil. The O-ring loading robot 1236 then places the O-ring onto the pre-pressing mechanism 1234. The material picking robot 1235 takes material to the pre-pressing mechanism 1234. The material picking robot 1235 assembles the O-ring onto the material and the pre-pressing mechanism 1234 presses the material to the O-ring. The screw tightening robot 1233 tightens the material.

Figure 13:
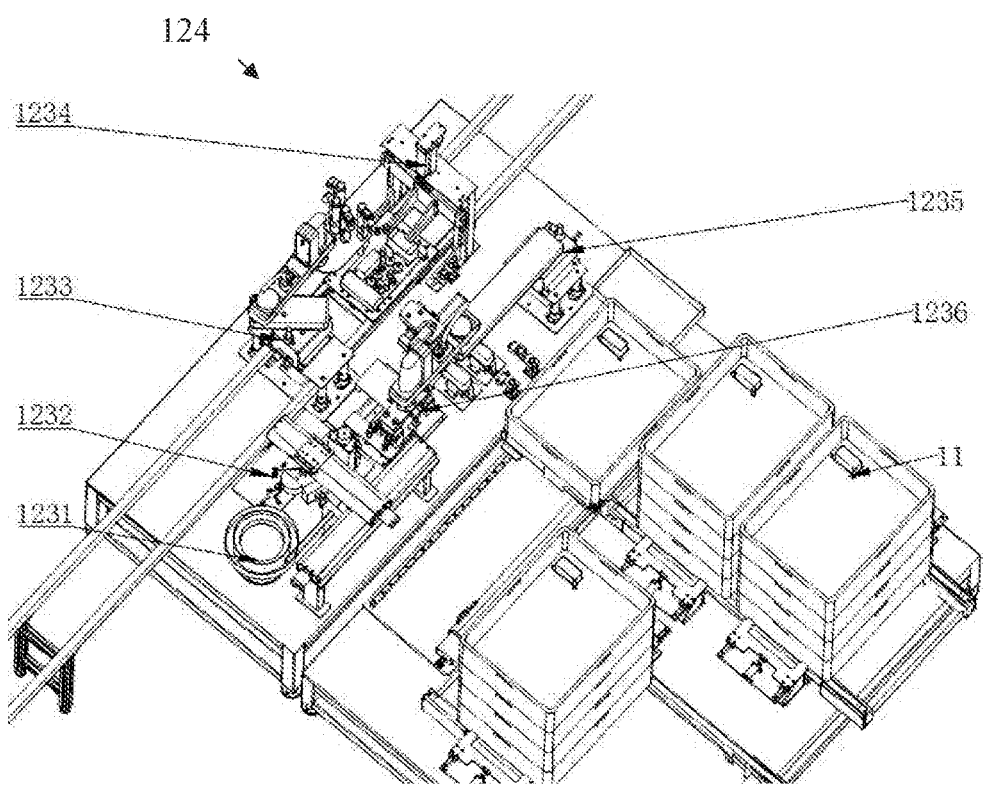
FIG. 13 is a perspective drawing illustrating one embodiment of a heat exchanger assembly module.

FIG. 13 is a perspective drawing illustrating one embodiment of a heat exchanger assembly module 124. The heat exchanger assembly module 124 is similar to the battery assembly module 123. The heat exchanger assembly module 124 includes a loading part 11, a vibration disk 1231, an oil coating mechanism 1232, a screw tightening robot 1233, a pre-pressing mechanism 1234, a material picking robot 1235, and an O-ring loading robot 1236.

The O-ring loading robot 1236 takes an O-ring from the vibration disk 1231 to the oil coating mechanism 1232, which coats the O-ring in oil. The O-ring loading robot 1236 then places the O-ring onto the pre-pressing mechanism 1234. The material picking robot 1235 takes material to the pre-pressing mechanism 1234. The material picking robot 1235 assembles the O-ring onto the material and the pre-pressing mechanism 1234 presses the material to the O-ring. The screw tightening robot 1233 tightens the material.

Figure 14:
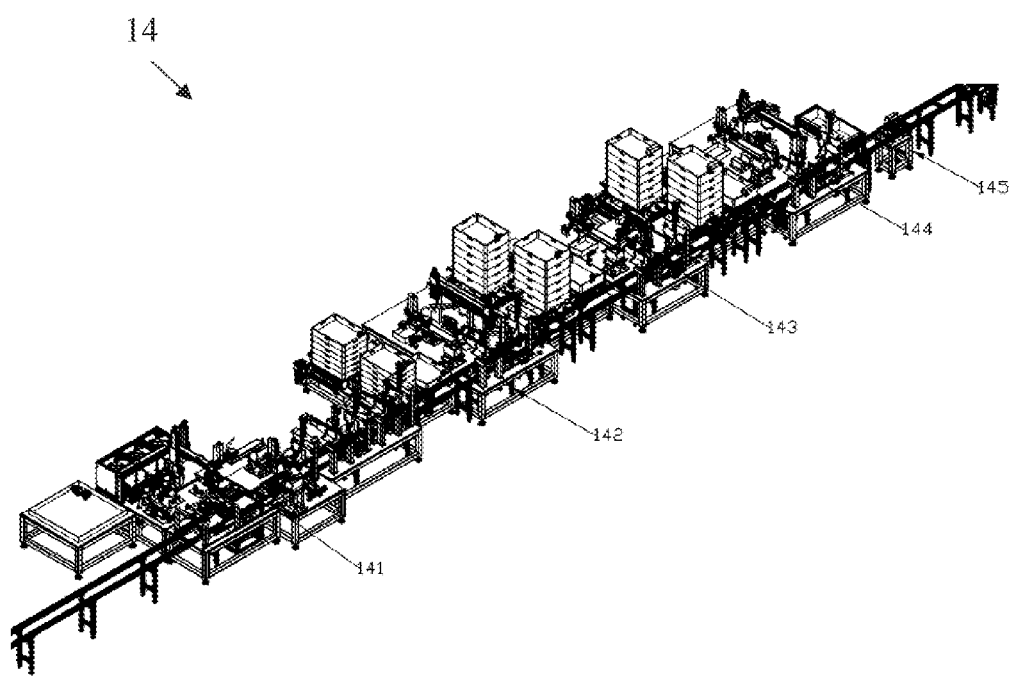
FIG. 14 is a perspective drawing illustrating one embodiment of a second assembling part.

FIG. 14 is a perspective drawing illustrating one embodiment of a second assembling part 14. The second assembling part 14 includes a water cooled manifold assembly module 141, a water pump assembly module 142, a multi-port valve assembly module 143, a kettle assembly module 144, and a second wire harness assembly module 145.

Figure 15:
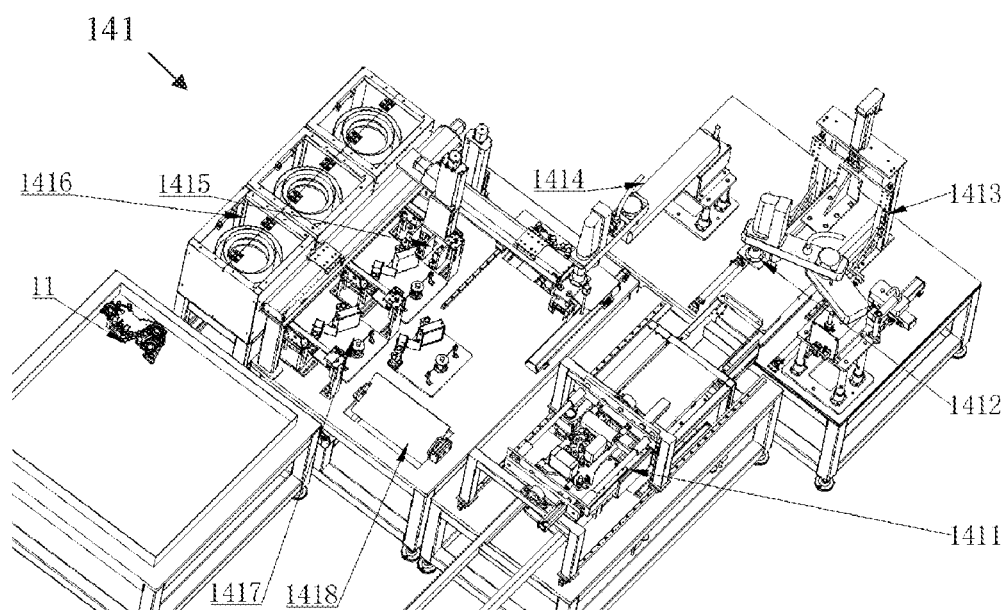
FIG. 15 is a perspective drawing illustrating one embodiment of a water cooled manifold assembly module.

FIG. 15 is a perspective drawing illustrating one embodiment of a water-cooling manifold assembly module 141. The water-cooling manifold assembly module 141 includes a base turning mechanism 1411, a tightening robot 1412, a press-fitting robot 1413, a manifold pre-assembly robot 1414, an O-ring assembly robot 1415, a vibrating plate 1416, a lubricating mechanism 1417, and a manifold turning mechanism 1418.

The manifold turning mechanism 1418 turns the manifold and the manifold pre-assembly robot 1414 pre-installs the manifold with a base. The O-ring assembly robot 1415 lubricates an O-ring with the lubricating mechanism 1417 then assembles the O-ring with a manifold. The press-fitting robot 1413 compresses the manifold and the tightening robot 1412 tightens the manifold. The manifold may be tightened by a plurality of tightening robots 1412.

Figure 16:
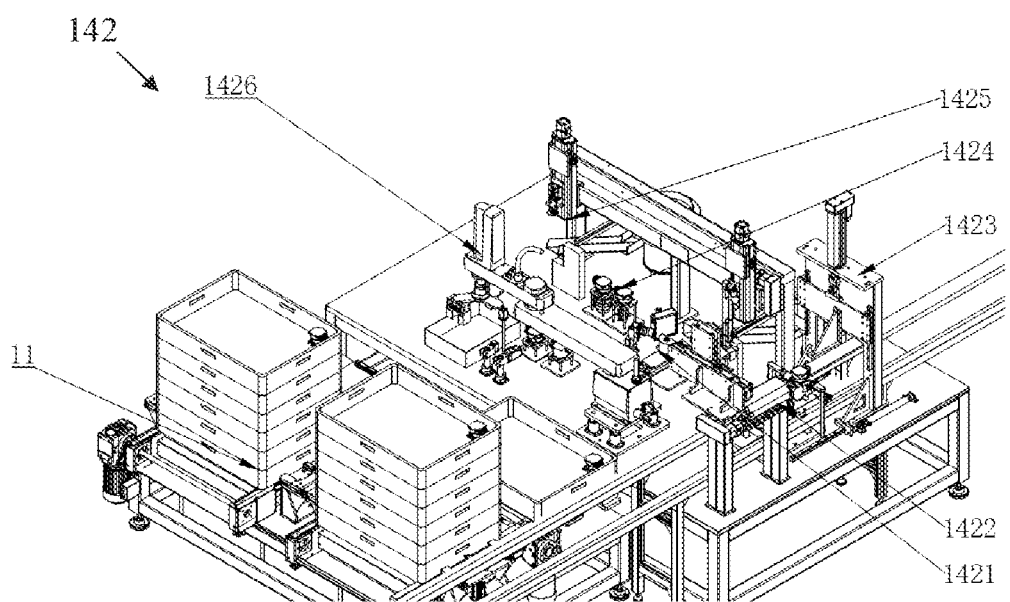
FIG. 16 is a perspective drawing illustrating one embodiment of a water pump assembly module.

FIG. 16 is a perspective drawing illustrating one embodiment of a water pump assembly module 142. The water pump assembly module 142 includes a loading part 11, a lubrication mechanism 1421, a tightening mechanism 1422, a pressing mechanism 1423, an O-ring assembly station 1424, an O-ring assembly robot 1425, and a water pump picking robot 1426.

The water pump picking robot 1426 holds a water pump and the O-ring assembly robot 1425 installs an O-ring. The water pump picking robot 1426 pre-assembles the water pump with a substrate. The pressing mechanism 1423 completes the assembly and the tightening mechanism 1422 adds a screw.

Figure 17:
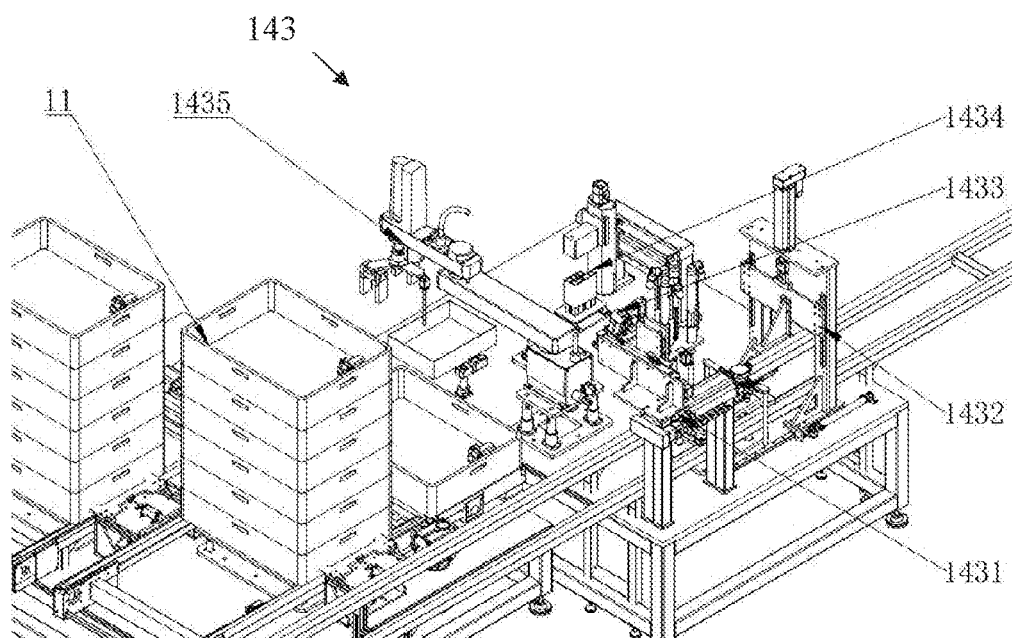
FIG. 17 is a perspective drawing illustrating one embodiment of a multi way valve assembly module.

FIG. 17 is a perspective drawing illustrating one embodiment of a multi-port valve assembly module 143. The multi-port valve assembly module 143 includes a loading part 11, a tightening mechanism 1431, a pressing mechanism 1432, a sealing gasket installation station 1433, a suction cup robot 1434, and a water valve grasping robot 1435.

The water valve grasping robot 1435 moves a water valve to the sealing gasket installation station 1433. The suction cup robot 1434 picks a sealing pad and pre-installs the sealing pad on a water pump. The water valve grasping robot 1435 installs the water valve on the water pump. The pressing mechanism 1432 presses the water valve to the water pump and the tightening mechanism 1431 tightens the water valve on the water pump.

Figure 18:
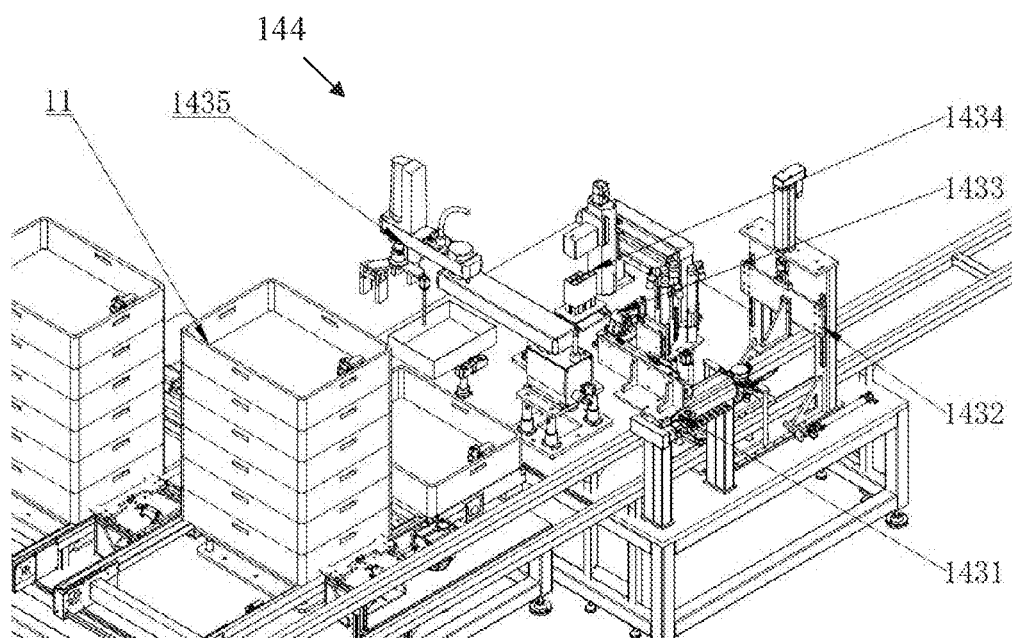
FIG. 18 is a perspective drawing illustrating one embodiment of a water bottle assembly module.

FIG. 18 is a perspective drawing illustrating one embodiment of a kettle assembly module 144. The kettle assembly module 144 is similar to the multi way valve assembly module 143. The kettle assembly module 144 includes a loading part 11, a tightening mechanism 1431, a pressing mechanism 1432, a sealing gasket installation station 1433, a suction cup robot 1434, and a water valve grasping robot 1435.

The water valve grasping robot 1435 moves a water valve to the sealing gasket installation station 143*e*. The suction cup robot 1434 picks a sealing pad and pre-installs the sealing pad on a water pump. The water valve grasping robot 1435 installs the water valve on the water pump. The pressing mechanism 1432 presses the water valve to the water pump and the tightening mechanism 1431 tightens the water valve on the water pump.

The present application provides a fully automatic intelligent production line 100 for a thermal management integrated module, which improves the production efficiency of the heat pump 200 through a flow-through assembly process and inserts the first testing part 13 and the second testing part 15 in the production process, so as to control the product quality of the heat pump 200.

What is disclosed above is only one embodiment of the present invention, but it is not intended to limit the scope of rights of the present invention. Those of ordinary skill in the art can understand that: without departing from the spirit and scope of the present invention and the appended claims changes, modifications, substitutions, combinations, and simplifications within the scope of the invention shall all be equivalent substitutions and still fall within the scope of the invention.

The invention claimed is:

1. An apparatus for assembling a heat pump, the apparatus comprising:
a loading part located in an initial section of a fully automatic intelligent production line of an integrated thermal management module, that conveys refrigerant side components and cooling water or assembling the heat pump;
a first assembling part, located downstream of the loading part, that assembles the refrigerant side components of the heat pump;
a first testing part, located downstream of the first assembling part, that tests the refrigerant side components;
a second assembling part, located downstream of the loading part, that assembles the cooling water side components of the heat pump;
a second testing part, located downstream of the second assembling part, that tests the cooling water side components, wherein at least one of the first testing part and/or second testing part each comprises a test module comprising:
a solenoid valve control device, configured to be connected with a solenoid valve in the heat pump, for controlling the solenoid valve;
an expansion valve control device, configured to be connected to an expansion valve in the heat pump, for controlling the expansion valve;
a ventilation device, configured to be connected with the heat pump, for feeding a test gas into the heat pump, wherein the ventilation device comprises an inlet end and an outlet end, one side of the inlet end is connected to an air source, and an other side of the inlet end is connected to a first gas path and a second gas path, and the first gas path sequentially comprises a high-pressure valve and a first shut-off valve, the second gas path comprises a lower-pressure valve and a second shut-off valve, the first gas path and the second gas path are connected in parallel, wherein one side of the outlet end is connected to a third gas path and a fourth gas path, the third gas path includes a third shut-off valve, the fourth gas path includes a fourth shut-off valve and a flowmeter in sequence, and the third gas path and the fourth gas path are connected in parallel;
a leak detection device, configured to be connected to the heat pump, and used to test whether the heat pump leaks;
a flow detection device, configured to be connected to the heat pump, and used to obtain a flow of the test gas; and
a finished product part, located downstream of the second testing part, that outputs a finished product.

2. The apparatus of claim 1, wherein the test module further comprises a storage module for storing a test program.

3. The apparatus of claim 2, wherein the test module further comprises a control module for acquiring the test program from the storage module and controlling the solenoid valve control device, the expansion valve control device, the ventilation device, the leak detection device and the flow detection device.

4. The apparatus of claim 1, wherein the test module further comprises a driving water pump control device, which is configured to be connected to a driving water pump in the heat pump and controls the driving water pump to test flow of the heat pump.

5. The apparatus of claim 1, further comprising a first pressure sensor arranged between the inlet end and a gas source in the first gas path, a second pressure sensor arranged between the low-pressure valve and the second shut-off valve in the second gas path, and a third pressure sensor arranged between the lower-pressure valve and the third shut-off valve.

6. The apparatus of claim 1, further comprising a third testing part disposed between the second testing part and the finished product part, and the third testing part includes a visual inspection module.

7. The apparatus of claim 1, wherein the first assembling part includes an expansion valve assembly module, a solenoid valve assembly module, a battery cooler assembly module, a heat exchanger assembly module, and a first wire harness assembly module.

8. The apparatus of claim 1, wherein the second assembling part comprises a water-cooling manifold assembly module, a water pump assembly module, a multi-port valve assembly module, a kettle assembly module, and a second wire harness assembly module.

9. A system for assembling a heat pump, the system comprising:
a loading part located in an initial section of a fully automatic intelligent production line of an integrated thermal management module, that conveys refrigerant side components and cooling water side for assembling pump;
a first assembling part, located downstream of the loading part, that assembles the refrigerant side components of the heat pump;
a first testing part, located downstream of the first assembling part, that tests the refrigerant side components;
a second assembling part, located downstream of the loading part, that assembles the cooling water side components of the heat pump;
a second testing part, located downstream of the second assembling part, that tests the cooling water side components, wherein at least one of the first testing part and/or second testing part each comprises a test module comprising:
a storage module for storing a test program;
a solenoid valve control device, configured to be connected with a solenoid valve in the heat pump, for controlling the solenoid valve;
an expansion valve control device, configured to be connected to an expansion valve in the heat pump, for controlling the expansion valve;
a ventilation device, configured to be connected with the heat pump, for feeding a test gas into the heat pump, wherein the ventilation device comprises an inlet end and an outlet end, one side of the inlet end is connected to an air source, and an other side of the inlet end is connected to a first gas path and a second gas path, and the first gas path sequentially comprises a high-pressure valve and a first shut-off valve, the second gas path comprises a lower-pressure valve and a second shut-off valve in turn, the first gas path and the second gas path are connected in parallel, wherein one side of the outlet end is connected to a third gas path and a fourth gas path, the third gas path includes a third shut-off valve, the fourth gas path includes a fourth shut-off valve and a flowmeter in sequence, and the third gas path and the fourth gas path are connected in parallel;
a leak detection device, configured to be connected to the heat pump, and used to test whether the heat pump leaks;
a flow detection device, configured to be connected to the heat pump, and used to obtain a flow of the test gas; and
a finished product part, located downstream of the second testing part, that outputs a finished product.

10. The system of claim 9, wherein the test module further comprises a control module for acquiring the test program from the storage module and controlling the solenoid valve control device, the expansion valve control device, the ventilation device, the leak detection device and the flow detection device.

11. The system of claim 10, wherein the test module further comprises a driving water pump control device, which is configured to be connected to a driving water pump in the heat pump and controls the driving water pump to test flow of the heat pump.

12. The system of claim 9, further comprising a first pressure sensor arranged between the inlet end and a gas source in the first gas path, a second pressure sensor arranged between the low-pressure valve and the second shut-off valve in the second gas path, and a third pressure sensor arranged between the lower-pressure valve and the third shut-off valve.

13. The system of claim 9, further comprising a third testing part disposed between the second testing part and the finished product part, and the third testing part includes a visual inspection module.

14. The system of claim 9, wherein the first assembling part includes an expansion valve assembly module, a solenoid valve assembly module, a battery cooler assembly module, a heat exchanger assembly module, and a first wire harness assembly module.

15. The system of claim 9, wherein the second assembling part comprises a water-cooling manifold assembly module, a water pump assembly module, a multi-port valve assembly module, a kettle assembly module, and a second wire harness assembly module.

* * * * *